United States Patent
Piirainen

(10) Patent No.: US 7,672,642 B2
(45) Date of Patent: Mar. 2, 2010

(54) UPLINK COMMUNICATION IN GSM/EDGE SYSTEM

(75) Inventor: Olli Piirainen, Oulu (FI)

(73) Assignee: Nokia Corporaation, Espoo (FI)

( * ) Notice: Subject to any disclaimer, the term of this patent is extended or adjusted under 35 U.S.C. 154(b) by 1105 days.

(21) Appl. No.: 11/312,492

(22) Filed: Dec. 21, 2005

(65) Prior Publication Data

US 2006/0160553 A1   Jul. 20, 2006

(30) Foreign Application Priority Data

Jan. 3, 2005   (FI) .................................. 20055001

(51) Int. Cl.
*H04B 1/00* (2006.01)
*H04B 1/04* (2006.01)
*H04B 7/00* (2006.01)
*H04M 3/00* (2006.01)
*H04M 1/00* (2006.01)

(52) U.S. Cl. .................. 455/42; 455/102; 455/112; 455/418; 455/517; 455/550.1

(58) Field of Classification Search ................ 455/63.4, 455/65, 101–105, 107, 112, 132, 168.1, 443, 455/450–451, 452.1–452.2, 453, 458, 509, 455/517, 552.1, 553.1, 550.1, 556.1, 561, 455/563, 575.7, 23, 41.2, 42, 62, 44, 102, 455/108, 110, 39, 73; 370/328–330, 334–338, 370/341–345, 347; 343/824–826; 332/108, 332/117, 119, 151, 161; 330/306; 375/240, 375/264, 272, 308, 324, 323, 335; 329/300, 329/304, 315; 381/328–321

See application file for complete search history.

(56) References Cited

U.S. PATENT DOCUMENTS

| 5,878,037 | A  | * | 3/1999 | Sherman ..................... 370/335 |
| 6,456,627 | B1 | * | 9/2002 | Frodigh et al. .............. 370/465 |
| 6,711,214 | B1 | * | 3/2004 | Hershberger ................ 375/285 |
| 6,891,841 | B2 | * | 5/2005 | Leatherbury et al. ........ 370/401 |
| 6,891,887 | B1 | * | 5/2005 | Dobson ...................... 375/220 |
| 7,477,694 | B2 | * | 1/2009 | Sanderford et al. ......... 375/261 |
| 2002/0106032 | A1 | * | 8/2002 | Navarro et al. .............. 375/259 |

FOREIGN PATENT DOCUMENTS

EP   1253733   10/2002
WO   WO 99/33237   7/1999

\* cited by examiner

*Primary Examiner*—Meless N Zewdu
(74) *Attorney, Agent, or Firm*—Squire, Sanders & Dempsey, LLP

(57) ABSTRACT

Embodiments of the invention relate to uplink communication in a GSM/EDGE telecommunication system. A method according to certain embodiments of the invention include at least one wide-band carrier wave in the group of carrier waves being generated in a mobile station by applying linear modulation at a first modulation symbol rate, the first modulation symbol rate being a multiple of a second modulation symbol rate, while preserving a predefined carrier spacing and allowing the at least one wide-band carrier wave to overlap with at least one adjacent carrier wave.

30 Claims, 4 Drawing Sheets

UPLINK COMMUNICATION IN GSM/EDGE SYSTEM

BACKGROUND

1. Field

The invention relates to an uplink communication method in a GSM/EDGE telecommunications system, a GSM/EDGE telecommunications system, a mobile station of a GSM/EDGE telecommunications system, a network element of a GSM/EDGE telecommunications system, and a computer program.

2. Description of the Related Art

The GSM/EDGE (Global System of Mobile communications/Enhanced Data rates for Global Evolution) technology has shown a great potential for increasing the data transfer capacity in wireless telecommunication. Several methods, such as multi-antenna and multi-carrier techniques have been suggested to improve the performance of GSM/EDGE systems.

Tools for improving the data transfer capacity in the uplink direction are severely limited when compared to those of the downlink direction. The multi-antenna and multi-carrier techniques increase the complexity of mobile stations, which increases the costs and physical dimensions of a mobile station. Consequently, the use of multi-antenna and multi-carrier techniques is typically restricted to downlink transmission, where the size of antenna arrangements and complexity do not pose a critical issue.

Therefore, it is useful to consider alternative techniques to improve the performance of GSM/EDGE systems in the uplink direction.

SUMMARY

An object of the invention is to provide a method, a GSM/EDGE telecommunications system, a mobile station, a network element, and a computer program with improved data transfer capacity. According to an aspect of the invention, there is provided an uplink communication method in a GSM/EDGE telecommunications system which applies diversity antennas in uplink reception and which GSM/EDGE telecommunications system utilizes a group of carrier waves modulated at a first modulation symbol rate, the carrier waves being separated by a predefined carrier spacing, the method comprising: generating, in a mobile station, at least one wide-band carrier wave in the group of carrier waves by applying linear modulation at a second modulation symbol rate, the second modulation symbol rate being a multiple of the first modulation symbol rate, while preserving the predefined carrier spacing and allowing the at least one wide-band carrier wave to overlap with at least one adjacent carrier wave.

According to a second aspect of the invention, there is provided a GSM/EDGE telecommunications system which applies diversity antennas in an uplink reception and which GSM/EDGE telecommunications system utilizes a group of carrier waves modulated at a first modulation symbol rate in the uplink, the carrier waves being separated by a predefined carrier spacing, the GSM/EDGE telecommunications system including: a mobile station including generating means for generating at least one wide-band carrier wave in the group of carrier waves by applying linear modulation at a second modulation symbol rate, the second modulation symbol rate being a multiple of the first modulation symbol rate; a network element including a wide-band carrier receiver for demodulating the wide-band carrier wave transmitted from the mobile station; and the GSM/EDGE telecommunications system is configured to preserve the predefined carrier spacing and to allow the at least one wide-band carrier wave to overlap with at least one adjacent carrier wave.

According to a third aspect of the invention, there is provided a mobile station of a GSM/EDGE telecommunications system which applies diversity antennas in uplink reception and which GSM/EDGE telecommunications system utilizes a group of carrier waves modulated at a first modulation symbol rate in the uplink, the carrier waves being separated by a predefined carrier spacing, the mobile station including a wide-band carrier wave generator for generating at least one wide-band carrier wave in the group of carrier waves by applying linear modulation at a second modulation symbol rate, the second modulation symbol rate being a multiple of the first modulation symbol rate, while preserving the predefined carrier spacing and allowing the at least one wide-band carrier wave to overlap with at least one adjacent carrier wave.

According to a fourth aspect of the invention, there is provided a network element of a GSM/EDGE telecommunications system which applies diversity antennas in uplink reception and which GSM/EDGE telecommunications system utilizes a group of carrier waves modulated at a first modulation symbol rate in the uplink, the carrier waves being separated by a predefined carrier spacing, the network element including a wide-band carrier receiver for demodulating a wide-band carrier wave transmitted from a mobile station and modulated with linear modulation at a second modulation symbol rate, the second modulation symbol rate being a multiple of the first modulation symbol rate, while preserving the predefined carrier spacing and allowing the at least one wide-band carrier wave to overlap with at least one adjacent carrier wave.

According to yet another aspect of the invention, there is provided a computer program embodied on a distribution medium, the computer program including encoded instructions for executing a computer process in a GSM/EDGE telecommunications system which applies diversity antennas in uplink reception and which GSM/EDGE telecommunications system utilizes a group of carrier waves modulated at a first modulation symbol rate in the uplink, the carrier waves being separated by a predefined carrier spacing, the computer process including a step of generating, in a mobile station, at least one wide-band carrier wave in the group of carrier waves by applying linear modulation at a second modulation symbol rate, the second modulation symbol rate being a multiple of the first modulation symbol rate, while preserving the predefined carrier spacing and allowing the at least one wide-band carrier wave to overlap with at least one adjacent carrier wave.

Preferred embodiments of the invention are described in the dependent claims.

The method, system, mobile station, network element and computer program of the invention provide several advantages. In a preferred embodiment of the invention, a wide-band carrier is introduced to the system by applying linear modulation at a symbol rate that is a multiple of the conventional symbol rate, while preserving the carrier spacing and allowing the carrier waves to overlap. As a consequence of the introduction of the wide-band carrier and preservation of the carrier spacing, the data transfer capacity of individual carriers and the overall data transfer capacity of the group of carriers increase.

BRIEF DESCRIPTION OF THE DRAWINGS

In the following, the invention will be described in greater detail with reference to the preferred embodiments and the accompanying drawings, in which.

DETAILED DESCRIPTION

Figure 1:
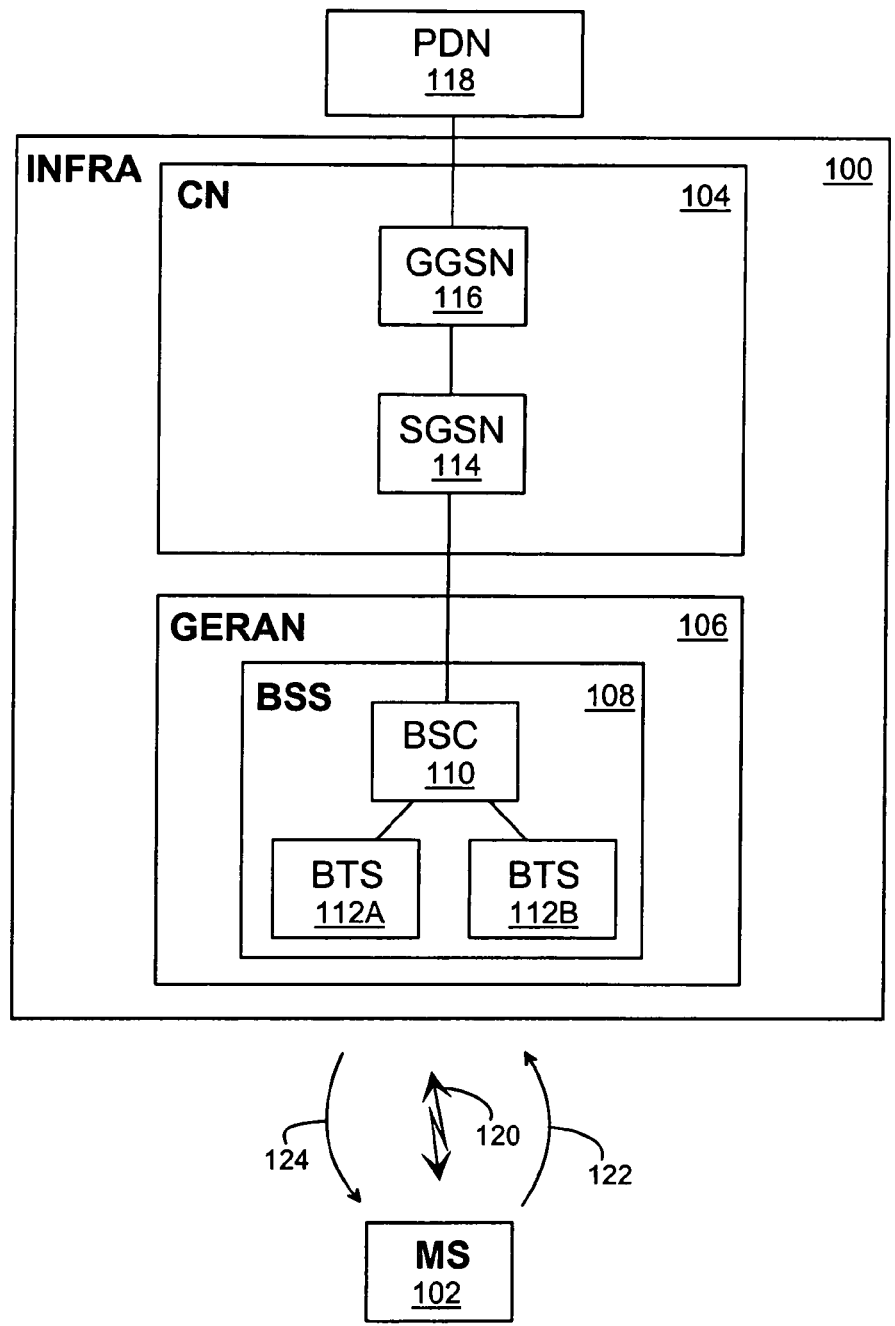
FIG. 1 shows an example of the structure of a GSM/EDGE communications system.

FIG. 1 illustrates an example of a GSM/EDGE telecommunications system. The abbreviations GSM and EDGE stand for Global System for Mobile Communications and Enhanced Data rates for Global Evolution, respectively.

The GSM/EDGE telecommunications system may be divided into an infrastructure (INFRA) 100 and a mobile station (MS) 102.

The infrastructure 100 includes a core network (CN) 104 and a GSM/EDGE radio access network (GERAN) 106.

The GERAN 106 includes a base station system (BSS) 108, which includes a base station controller (BSC) 110 and base transceiver stations (BTS) 112A, 112B. For the ease of discussion, the base transceiver station 112A, 112B is referred to as a base station 112A, 112B.

The mobile station 102 may also be referred to as user equipment, a mobile terminal, a subscriber terminal, a mobile telephone and a wireless game terminal.

The MS 102 includes a memory for storing encoded instructions of computer processes. The computer processes may be executed in a digital signal processor of the MS 102.

The CN 104 includes a serving GPRS support node (SGSN) 114, which is typically the centre point of the packet-switched domain of the CN 102. The main task of the SGSN 114 is to transmit packets to the mobile station 102 and receive packets from the mobile station 102 by using the GERAN 106. The SGSN 114 further contains subscriber and location information related to the mobile station 102.

A gateway GPRS (General Packet Radio Service) support node (GGSN) 116 is a gateway between the CN 104 and a packet data network (PDN) 118. The PDN 118 includes the Internet, for example.

The BSC 110 is responsible for the following tasks, for instance: radio resource management of the BTS 112A, 112B, inter-cell handovers, frequency control of the BTS 112A, 112B, management of frequency hopping sequences, time delay measurement on the uplink, implementation of the operation and maintenance interface, and power control.

The BSC 110 includes a memory for storing encoded instructions of computer processes. The computer processes may be executed in a digital signal processor of the BSC 110.

The BTS 112A, 112B comprises at least one transceiver which implements wireless communications channels 120 between the infrastructure 100 and the mobile station 102. The tasks the BTS performs 112A, 112B include, for example, calculation of timing advance (TA), uplink measurements, channel coding, encryption, decryption, frequency hopping, and managing GSM/EDGE protocols.

The BTS 112A, 112B includes a memory for storing encoded instructions of computer processes. The computer processes may be executed in a digital signal processor of the BTS 112A, 112B.

FIG. 1 exemplifies a GSM/EDGE telecommunications system by means of packet-switched functionality, also referred to as E-GPRS (Enhanced GPRS), and the corresponding network elements. In some embodiments, the GSM/EDGE telecommunications system includes circuit-switched domain, which supports ECSD (Enhanced Circuit Switched Data) functionality.

The SGSN 114 and the GGSN 116 represent second generation (2G) network elements of the CN 104. The CN 104 may further include third generation (3G) network elements, which may be connected to the 2G network elements and to the GERAN 106.

Figure 2:
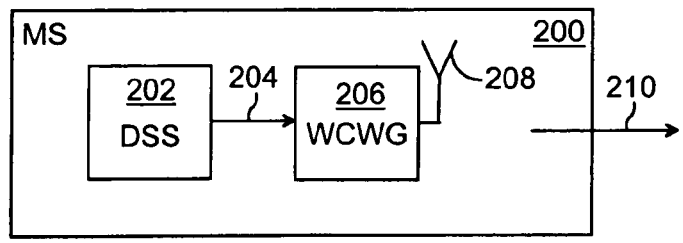
FIG. 2 illustrates an example of the structure of a mobile station.

FIG. 2 shows an example of the structure of a mobile station 200 by means of a block diagram. The mobile station 200 comprises a digital signal source (DSS) 202, a wide-band carrier wave generator (WCWG) 206 and an antenna 208.

The DSS 202 generates a digital signal 204 and feeds the digital signal 204 into the WCWG 206. The digital signal 204 may carry payload, signalling information and/or training sequences. The information content, however, is not a critical issue for the present solution, and the digital signal may carry any information that may be presented in a digital form. The WCWG 206 receives the digital signal 204, generates a wide-band carrier wave 210 by modulating the digital signal 204 with linear modulation, and transmits the wide-band carrier wave 210 over an air interface via the antenna 208.

The DSS 202 may perform tasks such as fetching a data stream from a data stream source, such as a memory, camera, and speech codec, providing source coding for the data stream, implementing a channel coding and/or interleaving on the data stream, and multiplexing the data stream according to an applied multiplexing method.

Figure 3A:
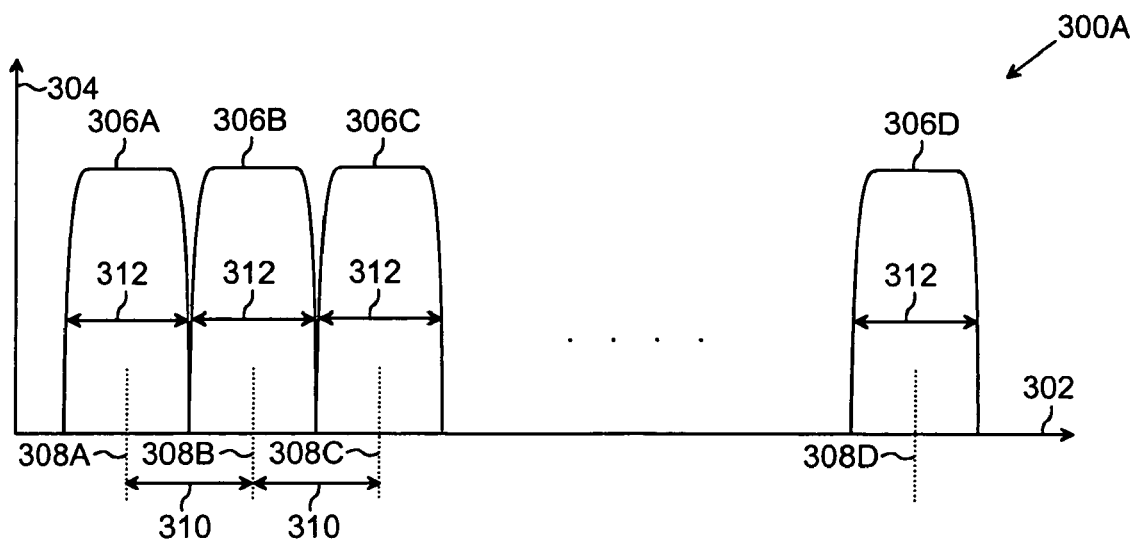
FIG. 3A illustrates an example of a group of carrier waves according to prior art.
Figure 3B:
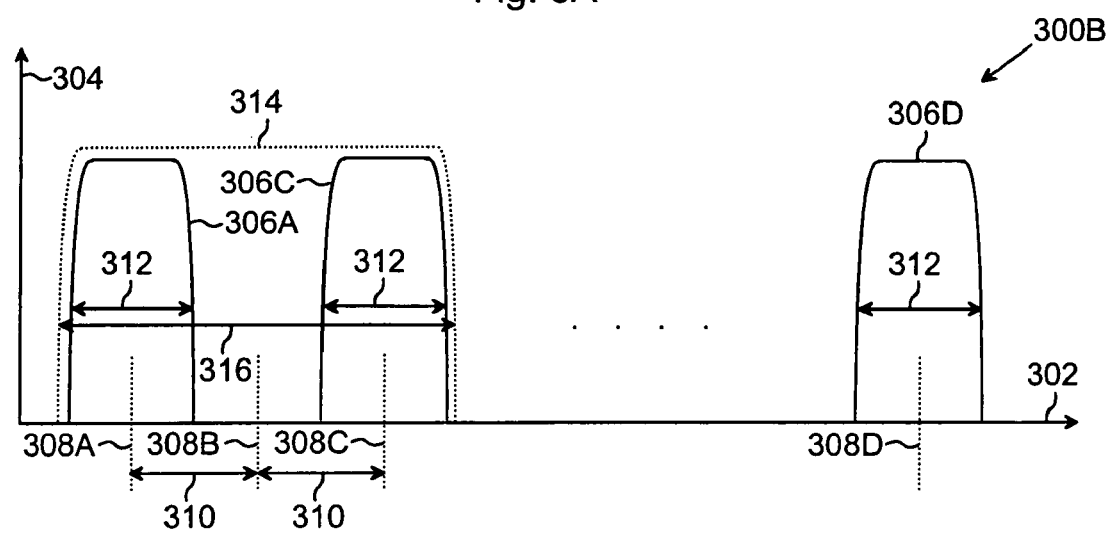
FIG. 3B illustrates a first example of a group of carrier waves according to an embodiment of the invention.
Figure 3C:
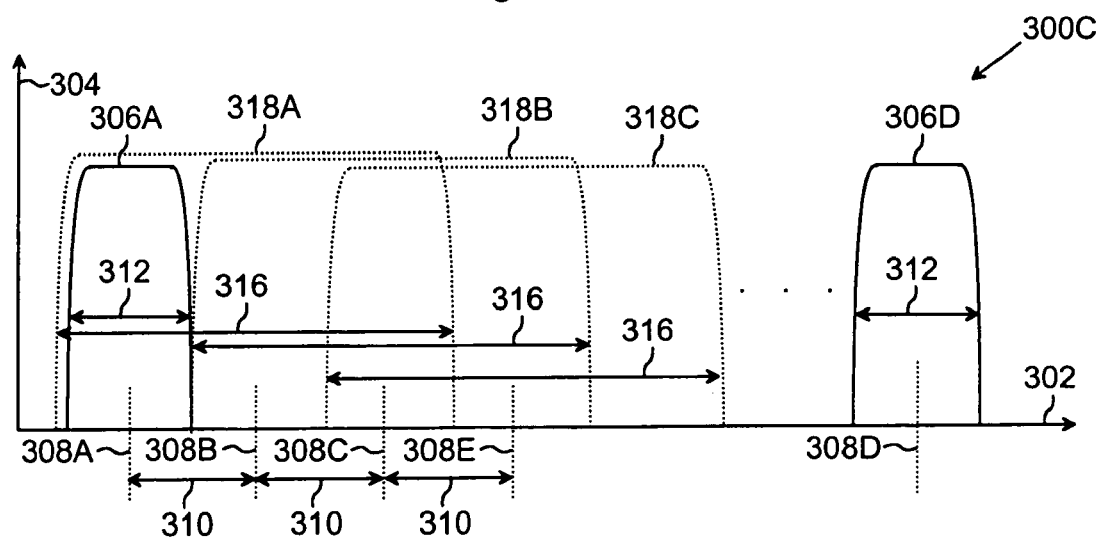
FIG. 3C illustrates a second example of a group of carrier waves according an embodiment of the invention.

With reference to FIGS. 3A, 3B and 3C, let us consider the carrier wave structure of the GSM/EDGE system. FIG. 3A shows the carrier wave structure according to the prior art, whereas FIGS. 3B and 3C illustrate the carrier wave structure according to embodiments of the invention. The x-axis 302 and y-axis 304 show frequency and signal power, respectively, in arbitrary units.

FIG. 3A shows a group of carrier waves 300A comprising narrow-band carrier waves 306A, 306B, 306C, 306D. In this context, the term "narrow band" refers to a narrow bandwidth 312 obtained with the conventional modulation symbol rate, also referred to as a first modulation symbol rate. A typical first modulation symbol rate of 13/48 MHz, also approximated with 270.833 kHz, results in the narrow bandwidth 312 of about 200 kHz.

The narrow-band carrier waves 306A-306D are separated by a predefined carrier spacing 310, which is typically defined as a separation of the band origins 308A, 308B, 308C, 308D of the narrow-band carrier waves 306A-306D. According to a GSM/EDGE specification, the predefined carrier spacing 310 is 200 kHz.

In FIG. 3B, a wide-band carrier 314 is generated into the group of the carrier waves 300B by applying linear modulation at a second modulation symbol rate that is a multiple of the first modulation symbol rate applied to the narrow-band carrier waves 306A-306D. In this case, the narrow-band carrier wave 306B is replaced with the wide-band carrier wave 314 while the structure of the rest of the group of the carrier waves 300A remains unaltered. The predefined carrier spacing 310 is preserved and the wide-band carrier wave 314 is allowed to overlap with adjacent carrier waves 306A, 306C.

In an embodiment of the invention, the second modulation symbol rate is twice the first modulation symbol rate. For example, when the first modulation symbol rate is 13/48 MHz, the second modulation symbol rate of 26/48 MHz, also approximated with 641.666 kHz, is obtained.

The linear modulation at the second modulation symbol rate results in a wide bandwidth 316 of the wide-band carrier wave 314. The second modulation symbol rate of 26/48 MHz results in the wide bandwidth 316 of about 600 kHz.

In the example of FIG. 3C, the group of carrier waves 300C includes wide-band carrier waves 318A, 318B, 318C. In this case, the location of the band origins 308B, 308C, 308E and the carrier spacing 310 of the wide-band carrier waves 318A, 318B, 318C are preserved with respect to the case where the group of carrier waves 300A, 300B includes narrow-band carrier waves 306A-306C.

The preservation of the band origins 308B, 308C, 308E and the carrier spacing 310 while introducing broadened bands of individual carriers results in an increased overall data transfer capacity of the group of carriers when compared to the narrow-band case.

In the transmission of the wide-band carrier wave 314, 318A-318C, the burst structure of the GSM/EDGE burst is preserved in the conventional structure, i.e. in the structure applied when transmitting signals at the first symbol rate.

In an embodiment of the invention, the length of the training sequences is extended from 26 to 52, where 26 and 52 correspond to the first modulation symbol rate and the second modulation symbol rate, respectively.

Figure 4:
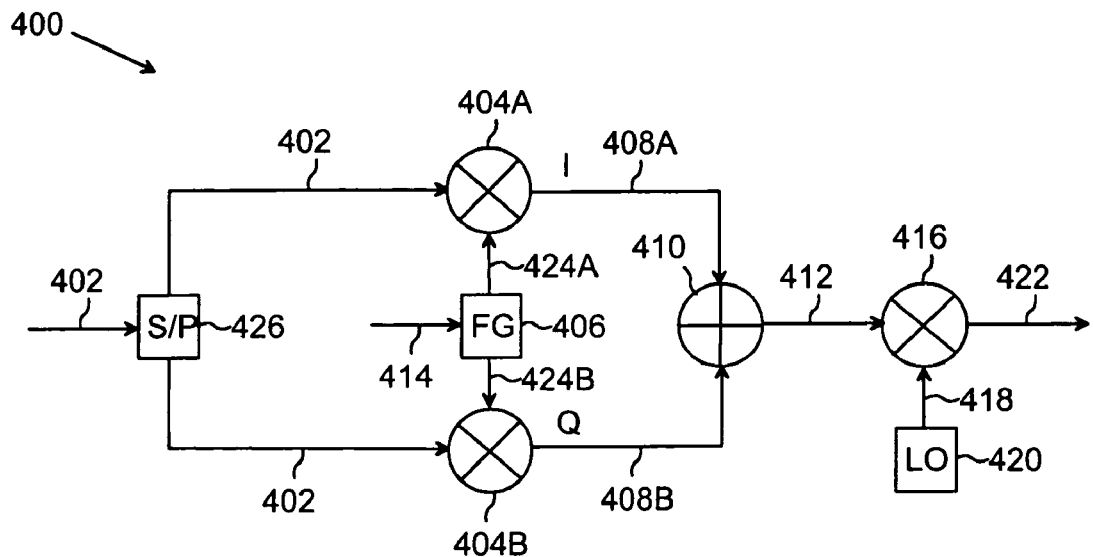
FIG. 4 illustrates an example of the structure of a wide-band carrier wave generator.

With reference to FIG. 4, the wide-band carrier wave generator 400 typically includes an I-modulator 404A and a Q-modulator 404B. The digital signal 402 is converted from a serial format into a parallel format in a serial-to-parallel converter (S/P) 426, and parallel components of the digital signal 402 are fed into the I-modulator 404A and the Q-modulator 404B.

The I-modulator 404A is provided with a first analog signal waveform 424A which encodes the bits of the digital signal 402 according to the applied linear modulation at the second modulation symbol rate.

The Q-modulator 404B is provided with a second analog signal waveform 424B which encodes the bits of the digital signal 402 according to the applied linear modulation at the second modulation symbol rate.

The first analog waveform 424A and the second analog waveform 424B may be generated in a frequency generator (FG) 406 which adjusts signal characteristics of the first analog waveform 424A and those of the second analog waveform 424B so that the applied modulation is realized. Such signal characteristics may be the relative phase and/or amplitude of the first analog waveform 424A and the second analog waveform 424B.

The frequency generator 406 may be provided with a control signal 414 including, for example, instructions on the applied modulation scheme and a clock signal. The timing information carried by the clock signal may be used to synchronize the feeding of the digital signal 402 into the wide-band carrier wave generator 400.

The I-modulator 404A outputs an I-branch waveform 408A into a combiner 410.

The Q-modulator 404B outputs a Q-branch waveform 408B into the combiner 410.

The combiner 410 combines the I-branch waveform 408A and the Q-branch waveform 408B and outputs a combined waveform 412.

The I-modulator 404A and the Q-modulator 404B may be implemented with a digital signal processor and software. In some applications, the I-modulator 404A and the Q-modulator 404B are implemented with ASICs (Application-Specific Integrated Circuit).

The combined waveform 412 is fed into an up-converter 416 which converts the combined waveform 412 into the wide-band carrier wave 422. The up-converter 416 is typically coupled to a local oscillator 420 which provides a local oscillator frequency 418 for the up-converter 416.

In an embodiment of the invention, the wide-band carrier wave generator 400 applies an M-ary phase shift keying (M-PSK), where M=2, 4, 8, 16, for encoding the bits of the digital signal 402 into the wide-band carrier wave 422 at the second symbol rate. In an embodiment of the invention, the wide-band carrier wave generator 400 applies an octal phase shift keying (8-PSK).

In another embodiment of the invention, the wide-band carrier wave generator 400 applies an M-ary quadrature amplitude modulation (M-QAM), where M=2, 4, 8, 16, 32 or 64, for encoding the bits of the digital signal 402 into the wide-band carrier wave 422 at the second symbol rate.

When applying an M-ary modulation rate, the tail bits, training sequence bits, and the data bits are encoded at the M-ary modulation rate.

In an embodiment of the invention, the wide-band carrier wave generator 400 is further capable of implementing narrow-band carrier waves 306A-306D.

Figure 5:
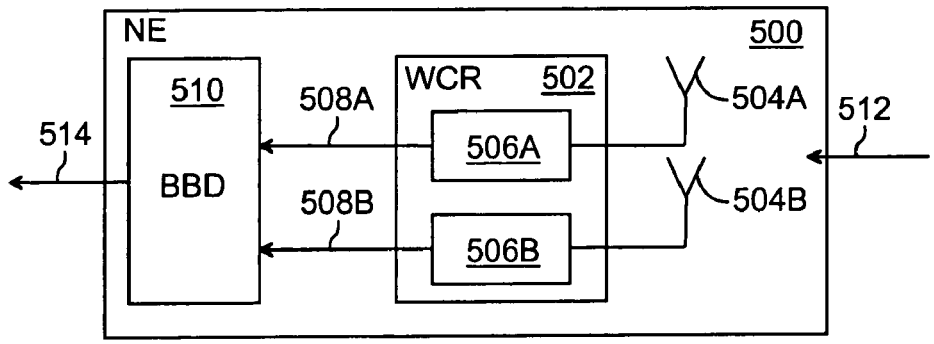
FIG. 5 illustrates an example of the structure of a network element.

With reference to FIG. 5, a network element (NE) 500 of the infrastructure 100 includes at least two diversity antennas 504A, 504B for sampling an electromagnetic field associated with the wide-band carrier wave 512 transmitted from the mobile station 102.

The diversity antennas 504A, 504B are coupled to a wide-band carrier receiver (WCR) 502 which receives and demodulates the wide-band carrier wave 512 at the second symbol rate. The WCR 502 may include receive antenna branches 506A, 506B, each coupled to an individual diversity antenna 504A, 504B. Each receive antenna branch 506A, 506B demodulates the wide-band carrier wave 512 separately, and outputs a receive antenna branch-specific digital signal 508A, 508B.

The receive antenna branch-specific digital signals 508A, 508B are inputted into a base band domain (BBD) 510 of the network element 500 for further processing. The BBD 510 outputs processed signals 514 to the higher layers of the GSM/EDGE telecommunications system.

In an embodiment of the invention, the network element 500 is a base station 112A, 112B.

In an embodiment of the invention, the network element 500 utilizes an interference rejection combining (IRC) algorithm in the uplink reception. The IRC algorithm may be directed at the receive antenna branch-specific digital signals 508A, 508B and implemented with a digital signal processor and software in the base band domain 510 of the network element 500.

In an IRC algorithm, multiple copies of versions of a signal containing the same data are received. The signals are combined so that the impact of interference is minimized.

IRC algorithms provide a well-known solution for reducing interference caused by overlapping carrier waves, such as the wide-band carrier waves 318A-318C shown in FIG. 3C. It is assumed that a person skilled in the art is capable of implementing IRC algorithms in GSM/EDGE telecommunications systems without further description.

Figure 6:
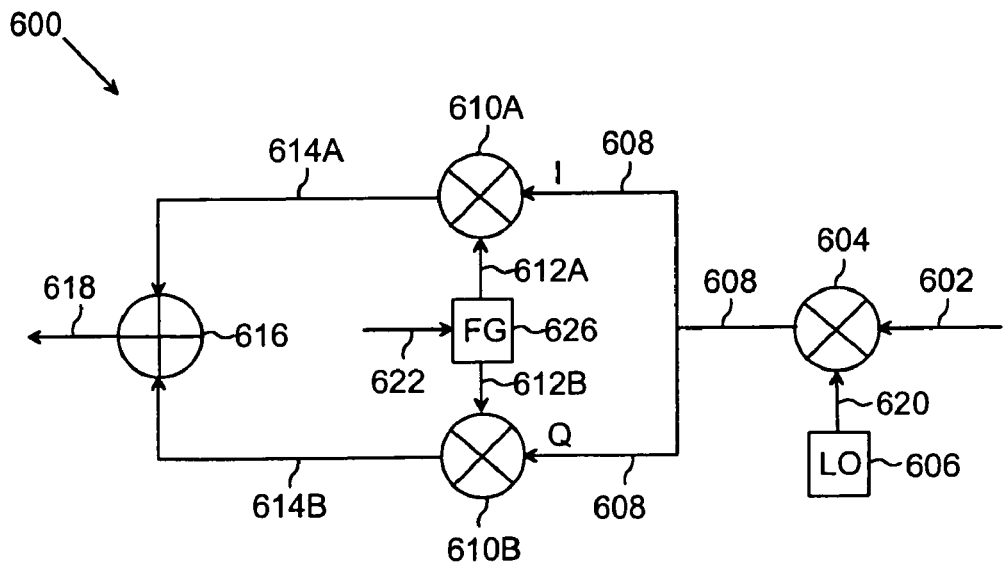
FIG. 6 shows an example of the structure of a receive antenna branch.

With reference to FIG. 6, an example of a receive antenna branch 600 corresponding to the receive antenna branch 508A, 508B of FIG. 5 is shown. The receive antenna branch 600 typically includes a down-converter 604, an I-demodulator 610A, a Q-demodulator 610B, a frequency generator 626 and a combiner 616.

The wide-band carrier wave 602 received by the diversity antenna 504A, 504B is inputted into the down-converter 604 which down-converts the wide-band carrier wave 602 into a low-frequency waveform 608. The down-converter 604 is provided with a local oscillator frequency 620 for the down-conversion. The local oscillator frequency 620 may be generated in a local oscillator 606.

The low-frequency waveform 608 is inputted into the I-demodulator 610A which demodulates the low-frequency waveform 608 and outputs an I-demodulated signal 614A.

The low-frequency waveform 608 is further inputted into the Q-demodulator 610B which demodulates the low-frequency waveform 608 and outputs a Q-demodulated signal 614B.

The I-demodulated signal 614A and the Q-demodulated 610B signal are fed into the combiner 616 which combines the I-demodulated signal 614A and the Q-demodulated 610B signal and outputs a combined digital signal 618.

The I-demodulator 610A and the Q-demodulator 610B are provided with an I-signal waveform 612A and a Q-signal waveform 612B, respectively.

The I-signal waveform 612A and the Q-signal waveform 612B may be generated in the frequency generator (FG) 626 which adjusts signal characteristics of the I-signal waveform 612A and those of the Q-signal waveform 612B so that the applied modulation is realized. Such signal characteristics may be the relative phase and/or amplitude of the I-signal waveform 612A and those of the Q-signal waveform 612B.

The I-demodulator 610A and the Q-demodulator 610B may be implemented with a digital signal processor and software. In some applications, the I-demodulator 610A and the Q-demodulator 610B are implemented with ASICs (Application-Specific Integrated Circuit).

The frequency generator 626 may be provided with a control signal 622 including, for example, instructions on the applied modulation scheme and a clock signal.

With further reference to FIG. 1, the mobile station 102 may in some embodiments signal capability information 122 to the infrastructure 100 about the capability of the mobile station 102 to apply the second modulation symbol rate. The capability information may include, for example, a list of modulation methods and modulation symbol rates supported by the mobile station 102. The capability information 122 may be signalled by using higher layer signalling and associated signalling channels.

The signalling associated with the capability information is received in the base station 112A, 112B and possibly delivered to higher layers, such as the base station controller 110 of the GERAN 106.

In an embodiment of the invention, the infrastructure 100 of the GSM/EDGE telecommunications system controls whether or not to apply the second modulation symbol rate in the mobile station 102. The decision whether to apply the second modulation symbol rate may be based on the capability information 122 received from the mobile station 102, the prevailing interference situation in the GSM/EDGE system, and the service being provided.

Control information 124 about the modulation symbol rate to be applied in the mobile station 102 may be generated in the base station 112A, 112B and/or in the base station controller 110 and signalled to the mobile station 102.

The mobile station 102 receives the control information 124 and the wide-band carrier wave generator 206 applies a modulation symbol rate according to the control information 124 provided by the infrastructure 100 of the GSM/EDGE telecommunications system.

Figure 7:
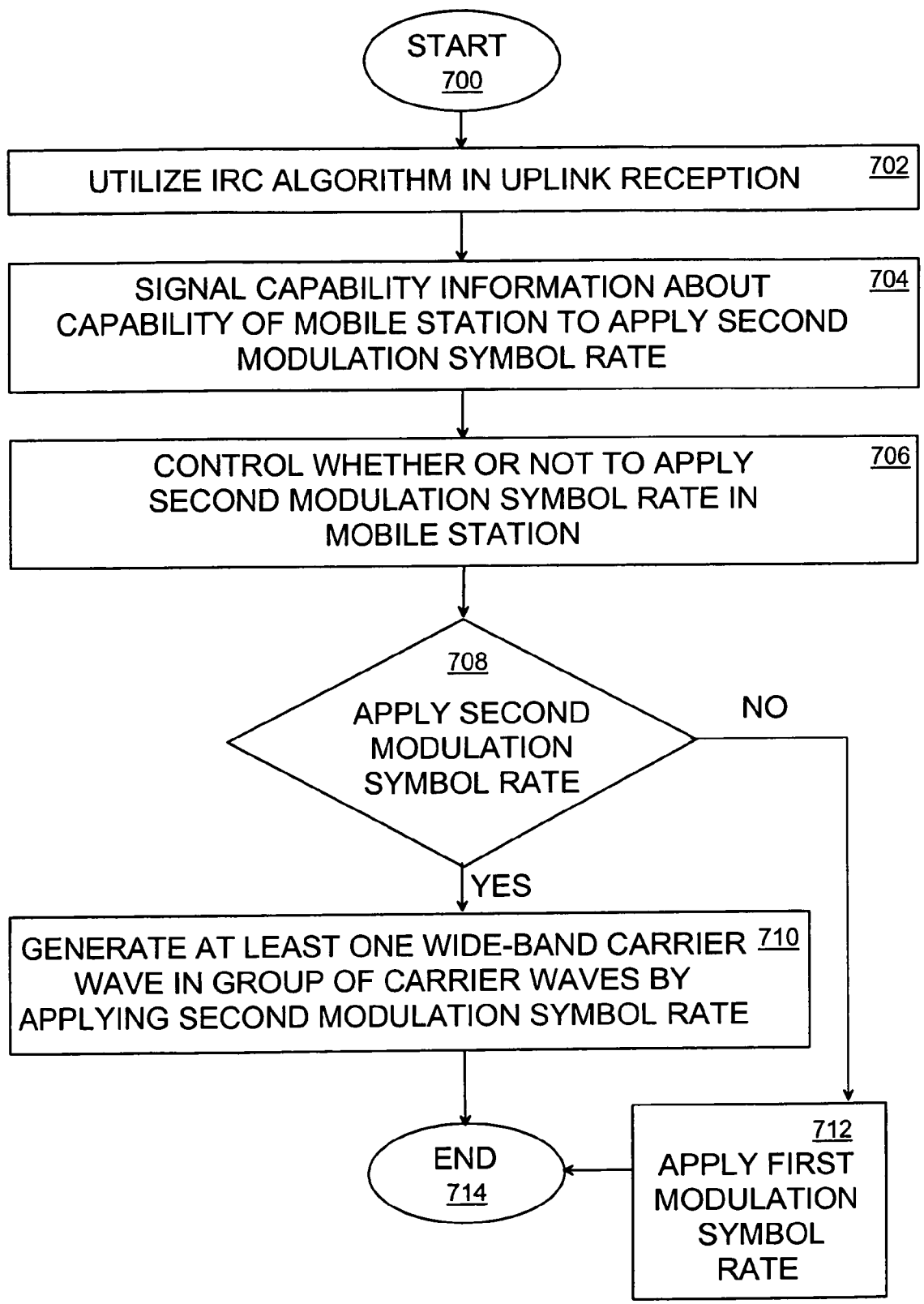
FIG. 7 illustrates an example of a methodology according to embodiments of the invention.

With reference to FIG. 7, a methodology according to embodiments of the invention is illustrated with a flow chart presentation.

In 700, the method starts.

In 702, the IRC algorithm is utilized in the uplink reception.

In 704, capability information 122 about the capability of the mobile station 102 to apply the second modulation symbol rate is signalled from the mobile station.

In 706, it is controlled, in the GSM/EDGE telecommunications system infrastructure 100, whether or not to apply the second modulation symbol rate in the mobile station 102.

In 708, a decision is made whether or not to apply the second modulation symbol rate in the mobile station 102. If the second modulation symbol rate is not applied, the first modulation symbol rate is used in 712. If the second modulation symbol rate is applied, the control information 124 is signalled.

In 710, at least one wide-band carrier wave 314, 318A, 318B, 318C is generated in the mobile station 102 in the group of carrier waves 300B, 300C by applying linear modulation at a second modulation symbol rate, the second modulation symbol rate being a multiple of the first modulation symbol rate, while preserving the predefined carrier spacing 310 and allowing the at least one wide-band carrier wave 314, 318A-318C to overlap with at least one adjacent carrier wave.

In 714, the method ends.

In an aspect, the invention provides a computer program embodied on a distribution medium. The computer program includes encoded instructions for executing a computer process in a GSM/EDGE telecommunications system. The computer process is described in conjunction with FIG. 7.

The computer process may be executed by using a digital signal processor and software. Whether to execute each process step in the mobile station 102, base station 112A, 112B or base station controller 110 is clear from the above description.

The distribution medium may comprise a computer readable medium, a program storage medium, a record medium, a computer readable memory, a computer readable software distribution package, and a computer readable compressed software package.

Even though the invention is described above with reference to an example according to the accompanying drawings, it is clear that the invention is not restricted thereto but it can be modified in several ways within the scope of the appended claims.

The invention claimed is:

1. An uplink communication method in a GSM/EDGE telecommunications system which applies diversity antennas in uplink reception and which GSM/EDGE telecommunications system utilizes a group of carrier waves modulated at a first modulation symbol rate, the carrier waves being separated by a predefined carrier spacing, the method comprising generating, in a mobile station, at least one wide-band carrier wave in the group of carrier waves by applying linear modulation at a second modulation symbol rate, the second modulation symbol rate being a multiple of the first modulation symbol rate, while preserving the predefined carrier spacing and allowing the at least one wide-band carrier wave to overlap with at least one adjacent carrier wave.

2. The uplink communication method of claim 1, wherein the step of generating comprises generating the at least one wide-band carrier wave, while preserving the duration of a GSM/EDGE burst.

3. The uplink communication method of claim 1, wherein the step of generating comprises generating the at least one wide-band carrier wave by applying an octal phase shift keying.

4. The uplink communication method of claim 1, wherein the first modulation symbol rate is 13/48 MHz and the second modulation symbol rate is 2×13/48 MHz.

5. The uplink communication method of claim 1, further comprising utilizing an interference rejection combining algorithm in the uplink reception.

6. The uplink communication method of claim 1, further comprising: signalling, from the mobile station, capability information about the capability of the mobile station to apply the second modulation symbol rate; and
controlling, in a GSM/EDGE telecommunications system infrastructure, whether or not to apply the second modulation symbol rate in the mobile station.

7. A GSM/EDGE telecommunications system which applies diversity antennas in an uplink reception and which GSM/EDGE telecommunications system utilizes a group of carrier waves modulated at a first modulation symbol rate in the uplink, the carrier waves being separated by a predefined carrier spacing, the GSM/EDGE telecommunications system including:
a mobile station including generating means for generating at least one wide-band carrier wave in the group of carrier waves by applying linear modulation at a second modulation symbol rate, the second modulation symbol rate being a multiple of the first modulation symbol rate;
a network element including a wide-band carrier receiver for demodulating the wide-band carrier wave transmitted from the mobile station; and
wherein the GSM/EDGE telecommunications system is configured to preserve the predefined carrier spacing and to allow the at least one wide-band carrier wave to overlap with at least one adjacent carrier wave.

8. The GSM/EDGE telecommunications system of claim 7, wherein the mobile station is configured to preserve the duration of a GSM/EDGE burst.

9. The GSM/EDGE telecommunications system of claim 7, wherein the generating means are configured to generate the at least one wide-band carrier wave applying an octal phase shift keying.

10. The GSM/EDGE telecommunications system of claim 7, wherein the first modulation symbol rate is 13/48 MHz and the second modulation symbol rate is 2×13/48 MHz.

11. The GSM/EDGE telecommunications system of claim 7, the GSM/EDGE telecommunications system being configured to utilize an interference rejection combining algorithm in the uplink reception.

12. The GSM/EDGE telecommunications system of claim 7, wherein the mobile station is configured to signal capability information about the capability of the mobile station to apply the second modulation symbol rate; and wherein the infrastructure of the GSM/EDGE telecommunications system is configured to control whether or not to apply the second modulation symbol rate in the mobile station.

13. A mobile station of a GSM/EDGE telecommunications system which applies diversity antennas in uplink reception and which GSM/EDGE telecommunications system utilizes a group of carrier waves modulated at a first modulation symbol rate in the uplink, the carrier waves being separated by a predefined carrier spacing, the mobile station including a wide-band carrier wave generator for generating at least one wide-band carrier wave in the group of carrier waves by applying linear modulation at a second modulation symbol rate, the second modulation symbol rate being a multiple of the first modulation symbol rate, while preserving the predefined carrier spacing and allowing the at least one wide-band carrier wave to overlap with at least one adjacent carrier wave.

14. The mobile station of claim 13, wherein the generator is configured to preserve the duration of a GSM/EDGE burst.

15. The mobile station of claim 13, wherein the wide-band carrier wave generator is configured to generate the at least one wide-band carrier wave by applying an octal phase shift keying.

16. The mobile station of claim 13, wherein the first modulation symbol rate is 13/48 MHz and the second modulation symbol rate is 2×13/48 MHz.

17. The mobile station of claim 13, wherein the GSM/EDGE telecommunications system utilizes an interference rejection combining algorithm in the uplink reception.

18. The mobile station of claim 13, the mobile station being configured to signal information to an infrastructure of the GSM/EDGE telecommunications system about the capability of the mobile station to apply the second modulation symbol rate; and
wherein the wide-band carrier wave generator is configured to apply a modulation symbol rate according to a control provided by the infrastructure of the GSM/EDGE telecommunications system.

19. A network element of a GSM/EDGE telecommunications system which applies diversity antennas in uplink reception and which GSM/EDGE telecommunications system utilizes a group of carrier waves modulated at a first modulation symbol rate in the uplink, the carrier waves being separated by a predefined carrier spacing, the network element including a wide-band carrier receiver for demodulating a wide-band carrier wave transmitted from a mobile station and modulated with linear modulation at a second modulation symbol rate, the second modulation symbol rate being a multiple of the first modulation symbol rate, while preserving the predefined carrier spacing and allowing the at least one wide-band carrier wave to overlap with at least one adjacent carrier wave.

20. The network element of claim 19, wherein the GSM/EDGE telecommunications system is configured to preserve the duration of a GSM/EDGE burst.

21. The network element of claim 19, wherein the wide-band carrier receiver is configured to demodulate the wide-band carrier wave by applying an octal phase shift keying.

22. The network element of claim 19, wherein the first modulation symbol rate is 13/48 MHz and the second modulation symbol rate is 2×13/48 MHz.

23. The network element of claim 19, wherein the network element is configured to utilize an interference rejection combining algorithm in the uplink reception.

24. The network element of claim 19, the network element being configured to receive signalling from the mobile station about the capability of the mobile station to apply the second modulation symbol rate; and
the network element being configured to signal control information to the mobile station about the modulation symbol rate to be applied in the mobile station.

25. A computer program embodied on a distribution medium, the computer program including encoded instructions for executing a computer process in a GSM/EDGE telecommunications system which applies diversity antennas in uplink reception and which GSM/EDGE telecommunications system utilizes a group of carrier waves modulated at a first modulation symbol rate in the uplink, the carrier waves being separated by a predefined carrier spacing, the computer process including a step of generating, in a mobile station, at least one wide-band carrier wave in the group of carrier waves by applying linear modulation at a second modulation symbol rate, the second modulation symbol rate being a multiple of the first modulation symbol rate, while preserving the predefined carrier spacing and allowing the at least one wide-band carrier wave to overlap with at least one adjacent carrier wave.

26. The computer program embodied on the computer readable medium of claim 25, wherein the computer process further includes generating the at least one wide-band carrier wave, while preserving the duration of a GSM/EDGE burst.

27. The computer program embodied on the computer readable medium of claim 25, wherein the computer process further includes generating the at least one wide-band carrier wave in the group of carrier waves by applying an octal phase shift keying.

28. The computer program embodied on the computer readable medium of claim 25, wherein the first modulation symbol rate is 13/48 MHz and the second modulation symbol rate is 2×13/48 MHz.

29. The computer program embodied on the computer readable medium of claim 25, wherein the computer process further includes utilizing an interference rejection combining algorithm in the uplink reception.

30. The computer program embodied on the computer readable medium of claim 25, wherein the computer process further includes:

signalling, from the mobile station, capability information about the capability of the mobile station to apply the second modulation symbol rate; and controlling, in a GSM/EDGE telecommunications system infrastructure, whether or not to apply the second modulation symbol rate in the mobile station.

\* \* \* \* \*